United States Patent [19]
Nagashima et al.

[11] 3,945,119
[45] Mar. 23, 1976

[54] VIBRATION ISOLATION DEVICE FOR HANDLES OF CHAIN SAW

[75] Inventors: Akira Nagashima, Mitaka; Hisashi Inaga, Tokyo, both of Japan

[73] Assignee: Kioritz Corporation, Tokyo, Japan

[22] Filed: May 22, 1975

[21] Appl. No.: 580,040

[30] Foreign Application Priority Data
Jan. 28, 1975   Japan.............................. 50-11527

[52] U.S. Cl.................................. 30/383; 173/162
[51] Int. Cl.².......................................... B27B 17/02
[58] Field of Search ............ 30/381, 382, 383, 384, 30/385, 386, 387; 173/162

[56] References Cited
UNITED STATES PATENTS

| | | | |
|---|---|---|---|
| 3,542,095 | 11/1970 | Frederickson | 30/381 |
| 3,700,015 | 10/1972 | Kobayashi | 173/162 |
| 3,728,793 | 4/1973 | Makinson | 30/383 |
| 3,823,474 | 7/1974 | Ionescu | 30/383 |
| 3,845,827 | 11/1974 | Schulin | 173/162 |

Primary Examiner—Al Lawrence Smith
Assistant Examiner—J. C. Peters
Attorney, Agent, or Firm—Karl W. Flocks

[57] ABSTRACT

An engine unit enclosing an engine, a fuel tank, an oil tank and a chain driving system is mounted on a handle assembly consisting of a front handle, a rear handle and a handle connecting member interconnecting the front and rear handle and supporting the bottom of the engine unit through three vibration isolators made of an elastic material. The rear end of the handle connecting member is joined through a vibration isolator to the rear end of the rear handle, and the front upper end of the rear handle is joined through vibration isolator to the top of the engine unit. The upper end of the front handle is positioned in parallel with the upper end of the rear handle in the horizontal direction and joined thereto through a vibration isolator, and the lower end of the front handle is joined directly to the front end of the handle connecting member.

3 Claims, 5 Drawing Figures

VIBRATION ISOLATION DEVICE FOR HANDLES OF CHAIN SAW

BACKGROUND OF THE INVENTION

The present invention relates to a vibration isolation system for the handles of a chain saw.

There have been devised and demonstrated various vibration isolation systems for chain saws for minimizing the transmission of the vibrations of the engine of the chain saw to the handles thereof so that the operator may firmly grip the handles to prevent the jump and wobble of the chain cutter, but so far they are not satisfactory in practice. Too much vibrations of the handles adversely affect not only the sawing operation but also the health of the operator when he uses the chain saw for a long time. In general, the rubber pads have been long used as the vibration isolators, but the use of the rubber pads generally results in the reduction in rigidity of the joints between the handles and the engine unit so that the chain saws cannot withstand the heavy duty operation.

SUMMARY OF THE INVENTION

The present invention was therefore made to overcome the above and other problems encountered in the conventional gas chain saws.

Briefly stated, according to the present invention, the bottom of the engine unit of a gas chain saw is mounted through vibration isolators on a handle connecting member which interconnects between a front handle and a rear handle. The handle connecting member is extended backwardly of the engine unit and has its rear end joined through a vibration isolator to the rear end of the rear handle. The rear handle is extended over the top of the engine unit and has its upper end joined through a vibration isolator thereto.

The front handle in the form of C when viewed from the front of the chain saw has its lower end joined to the front end of the handle connecting member. The upper end of the front handle is bent at a right angle to be extended backwardly in parallel with the longitudinal axis of the engine unit, is positioned in parallel with the upper end of the rear handle in the lateral direction, and is joined through a vibration isolator to the upper end of the rear handle. Thus, one of the novel features of the present invention resides in the arrangement in which the upper end of the front handle is joined through the vibration isolator to the upper end of the rear handle.

One of the objects of the present invention is therefore to minimize the vibrations transmitted from the engine of a gas chain saw to the handle assembly thereof and to increase the rigidity of the handle assembly, whereby the positive and easy sawing operation may be ensured.

Another object of the present invention is to provide a vibration isolation system for a chain saw which is simple in construction and is very economical.

DESCRIPTION OF THE PREFERRED EMBODIMENTS

Figure 1:
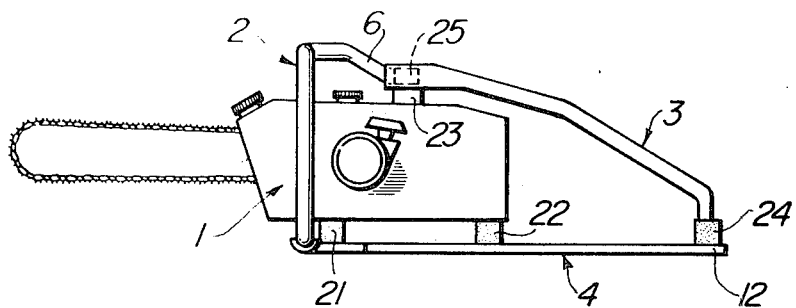
FIG. 1 is a schematic side view of a gas chain saw in accordance with the present invention.
Figure 2:
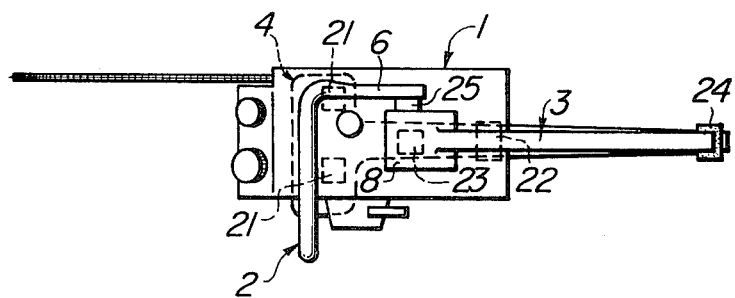
FIG. 2 is a top view thereof.
Figure 3:
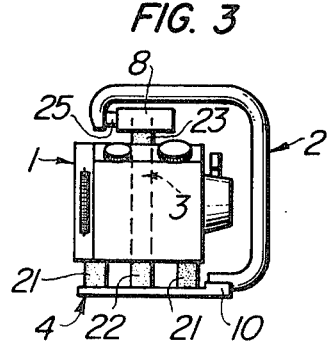
FIG. 3 is a front end view thereof.

First Embodiment, FIGS. 1, 2 and 3

Figure 4:
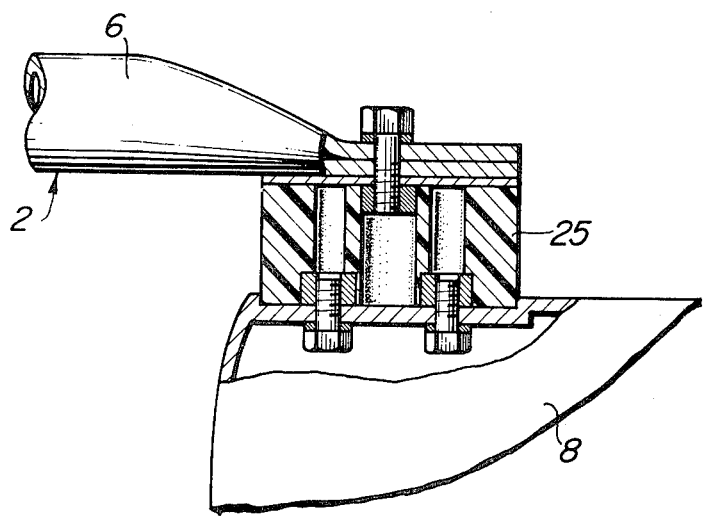
FIGS. 4 and 5 are sectional views, on enlarged scale, two embodiments, respectively of the vibration isolators according to the present invention.

Referring to FIGS. 1 to 3, an engine unit 1 enclosing therein an engine, a fuel tank, an oil tank and a chain cutter driving unit is mounted through vibration isolators 21, 22 and 23 on a frame-shaped handle assembly consisting of a front handle 2, a rear handle 3 and a handle connecting member 4 interconnecting between the front and rear handles 2 and 3. One end of the connecting member 4 is securely attached at 10 to the lower end of the front handle 2 as best shown in FIG. 4, and the handle connecting member 4 is extended backward below the engine unit 1 and has its the other end 12 attached through the vibration isolator 24 to the rear handle 3. The front upper end 8 of the rear handle 3 is joined through the vibration isolator 23 to the upper rear end portion of the engine unit 1 and is also attached through the vibration isolator 25 to the upper end 6 of the front handle 2.

Figure 5:
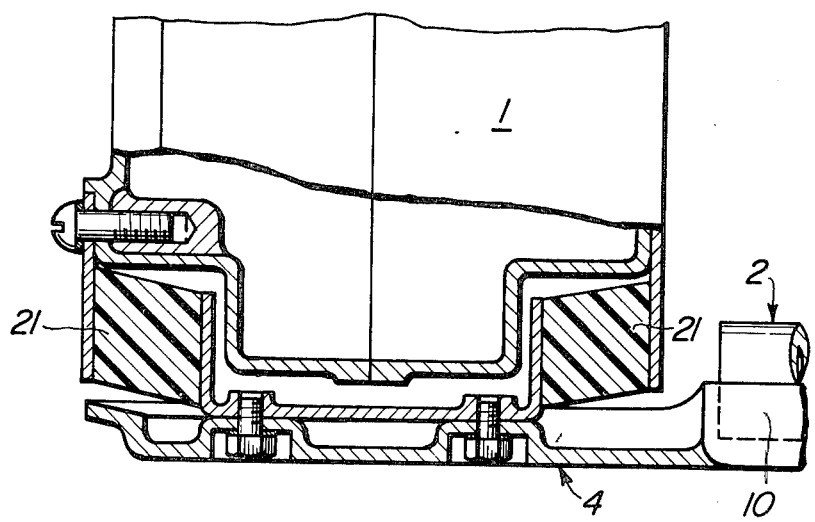

In the instant embodiment, the vibration isolators 21, 22, 23, 24 and 25 are made of an elastic material such as synthetic rubber and are of the inherent damping type which dampens and absorbs the vibrations by the internal hysteresis, i.e. shearing stresses and strains in the vertical direction of the vibration isolators. Two examples of the vibration isolators in accordance with the present invention are shown in FIGS. 4 and 5, respectively.

In the conventional gas chain saws, the upper and lower ends of the front handle are attached through the vibration isolators to the engine unit so that considerably strong vibrations are still transmitted to the front handle. However, according to the present invention, the upper and lower ends of the rear handle 3 are attached through the vibration isolators to the engine unit and to the rear end of the handle connecting member as described above so that the vibrations are considerably dampened and absorbed. Furthermore, the upper end of the rear handle is attached through the vibration isolator to the front handle so that the vibrations transmitted thereto are satisfactorily dampened and absorbed to such an extent hitherto unattainable by the conventional gas chain saws. Furthermore the handle assembly consisting of the front and rear handle and the handle connecting member is so arranged so as to surround the engine unit. Moreover, the bottom of the engine unit is mounted upon the handle connecting member though three vibration isolators arrayed as best shown in FIG. 5. That is, two front vibration isolators 21 are positioned in parallel with each other and with the axis of the driving shaft of the engine enclosed in the engine unit and the remaining vibration isolator 22 is positioned backwardly of the front vibration isolators. Therefore the three vibration isolators 21 and 22 make up a three-point suspension for the engine unit. The handle connecting member 4 is extended backward and is connected to the rear handle through the vibration isolator so that the vibrations in the vertical direction relative to the connection between the rear handle and the handle connecting member may be dampened and absorbed and that the joint between the rear handle and the handle connecting member exhibits as high rigidity in the direction perpendicular to the vertical axis of the joint between the rear handle and the handle connecting member. Thus, an operator may securely hold the gas chain saw in position when he firmly grips the front and rear handles to exert the forces forwardly; that is, in the direction of the travel of the chain saw blade.

As described above, according to the present invention, the vibrations may be satisfactorily isolated, and the adverse effects on the operation and efficiency of the chain saw due to the decrease in rigidity may be prevented. Furthermore, the engine unit is not required to be provided with means for connection with the front handle so that the construction of the chain saw may be much simplified.

What is claimed is:

1. In a gas chain saw, a combination comprising
   a. an engine unit enclosing therein an engine, a fuel tank, an oil tank and a chain driving unit;
   b. a front handle so arranged as to surround the upper portion and one side portion of said engine unit in spaced apart relation therewith;
   c. a rear handle extended backwardly of said engine unit; and
   d. a handle connecting member attached through vibration isolators made of an elastic material to the bottom portion of said engine unit and extended backwardly thereof,
   the rear end of said handle connecting member being joined through a vibration isolator the rear end of said rear handle,
   the front end of said rear handle being joined through a vibration isolator to the upper portion of said engine unit,
   the upper end of said front handle being positioned in opposed relation with the upper end of said rear handle in the horizontal direction and joined together through a vibration isolator.

2. A combination as set forth in claim 1 wherein said vibration isolators are made of elastic rubber.

3. A combination as set forth in claim 1 wherein said vibration isolators interposed between said engine unit and said handle connecting member comprises two vibration isolators positioned in parallel with each other and spaced apart from each other by a suitable distance in the lateral direction of said engine, unit and one vibration isolator positioned backwardly of said two vibration isolators.

* * * * *